United States Patent
Busi et al.

(10) Patent No.: US 7,447,213 B2
(45) Date of Patent: Nov. 4, 2008

(54) METHOD AND APPARATUS FOR END-TO-END CONNECTION BETWEEN AN RPR AND AN MPLS NETWORK

(75) Inventors: Italo Busi, Cerro Maggiore (IT); Pietro Grandi, Milan (IT); Michele Fontana, Verderio Superiore (IT)

(73) Assignee: ALCATEL, Paris (FR)

( * ) Notice: Subject to any disclaimer, the term of this patent is extended or adjusted under 35 U.S.C. 154(b) by 909 days.

(21) Appl. No.: 10/614,803

(22) Filed: Jul. 9, 2003

(65) Prior Publication Data

US 2004/0022268 A1 Feb. 5, 2004

(30) Foreign Application Priority Data

Aug. 2, 2002 (EP) .................................. 02291952

(51) Int. Cl.
*H04L 12/56* (2006.01)
(52) U.S. Cl. .................... 370/395.5; 370/466; 370/469; 370/473; 370/474; 370/403; 370/404; 370/405
(58) Field of Classification Search .............. 370/395.5, 370/466, 469
See application file for complete search history.

(56) References Cited

U.S. PATENT DOCUMENTS

| | | | | |
|---|---|---|---|---|
| 6,785,285 B1* | 8/2004 | Romana et al. | ........ | 370/395.51 |
| 6,788,681 B1* | 9/2004 | Hurren et al. | ............... | 370/389 |
| 6,847,644 B1* | 1/2005 | Jha | ............................ | 370/392 |
| 6,862,288 B2* | 3/2005 | Sharma et al. | .............. | 370/403 |
| 7,006,525 B1* | 2/2006 | Jha | ............................ | 370/466 |
| 7,102,997 B2* | 9/2006 | Sultan et al. | ................. | 370/233 |
| 7,145,878 B2* | 12/2006 | Katz | .......................... | 370/238 |
| 7,260,097 B2* | 8/2007 | Casey | ......................... | 370/392 |
| 2003/0189898 A1* | 10/2003 | Frick et al. | .................. | 370/227 |
| 2003/0206548 A1* | 11/2003 | Bannai et al. | ............... | 370/389 |
| 2003/0208525 A1* | 11/2003 | Bannai et al. | ............... | 709/201 |

OTHER PUBLICATIONS

River Stone: "How Ethernet, RPR and MPLS Work Together", White Paper from Riverstone Networks, 'Online! Sep. 2001, pp. 1-19, XP002231554.
L. Daans: "Alcatel Meltro Node", Alcatel Telecommunications Review, 'Online! Jan. 2002, pp. 13-18, XP002232662.
Luca Martini, "Encapsulation Methods for Transport of Ethernet Frames Over IP and MPLS Networks", IETF Internet Draft, 'Online! Jul. 2002, pp. 1-20, XP002231555.

* cited by examiner

*Primary Examiner*—Rafael Pérez-Gutiérrez
*Assistant Examiner*—Allahyar Kasraian
(74) *Attorney, Agent, or Firm*—Sughrue Mion, PLLC

(57) ABSTRACT

The present invention provides for a method and apparatus for an end-to-end connection between an RPR and an MPLS network, where the RPR network is linked to the MPLS network (and viceversa) through a TLS layer. In a preferred solution, the client layer is Ethernet, but any client layer can be considered.

4 Claims, 3 Drawing Sheets

METHOD AND APPARATUS FOR END-TO-END CONNECTION BETWEEN AN RPR AND AN MPLS NETWORK

INCORPORATION BY REFERENCE OF PRIORITY DOCUMENT

This application is based on and claims the benefit of European Patent Application No. 02 291 952.6 filed Aug. 2, 2002, which is incorporated by reference herein.

BACKGROUND OF THE INVENTION

1. Field Of The Invention

The present invention relates to the data transport networks and in particular to a method and apparatus for end-to-end connection between an RPR and an MPLS network.

2. Description Of The Prior Art

As known, the Local Area Networks (LAN) are packet-switched networks which are optimized for the data traffic by using the Ethernet technology. Ethernet is one of the most consolidated technologies to interconnect computers in a LAN network and are based on a bus topology.

The data transport networks, such as for instance the RPR (Resilient Packet Ring) networks are known, fit for the optimal utilization of the available band for packet transport in ring networks. The mechanisms for the operation of the RPR networks are under standardization by the IEEE.

The ring technology can be based—for instance—on physical transport layers SDH, SONET or Ethernet, where the frames of the RPR networks are physically transported. A known RPR network is based upon a two counter-rotating rings configuration, respectively identified as Inner Ringlet and Outer Ringlet. Both the rings are used to transport the data and/or control RPR frames among a series of RPR nodes. RPR is a so-called layer-2 technology with respect to the ISO-OSI or TCP-IP layering.

The format of a RPR frame comprises a part of Header and a part of Payload. The part of payload contains the information of the upper layer to be transported. Among the various fields of the RPR Header, there are the following:

Identifier of the RPR destination node;

Identifier of the RPR source node; and

Protocol Type: identifies the protocol which characterizes the following part of RPR frame/packet, namely the information of upper layer in the payload.

In each node of a RPR ringlet, the RPR Header is read and the RPR destination node is identified: if the identifier of the destination node corresponds to the identifier of the RPR node which has received the packet, the packet is extracted from the RPR network, otherwise it is forwarded transparently without any processing till reaching the RPR destination node. Another intrinsic characteristic of the RPR networks is that of transporting to the destination also the errored frames, unless the error is an obstacle for the intermediate RPR nodes to identify the RPR destination node. The latest shall be free of deciding if the packet is to be rejected or passed to the upper layer, depending on the type and the "heaviness" of the error.

Typically, on each input/output node are laid several ports connected to customers or upper layers. This means that an RPR node receives frames generated by several ports to be introduced into the RPR network and to be transported to destination where, of course, the frames shall be re-assigned to the respective output ports. Unfortunately, the RPR mechanism does not foresee this type of "select" functionality since it considers only a single input and a single output for each RPR node, and this is one of the problems to be addressed by the present invention.

In the "data world", in particular for meshed networks, it is also known the MPLS technology: MPLS stands for "Multi-protocol" Label Switching, multi-protocol because its techniques are applicable to any network layer protocol.

As a packet of a connectionless network layer protocol travels from one router to the next, each router makes an independent forwarding decision for that packet. Each router independently chooses a next hop for the packet, based on its analysis of the packet's header and the results of running the routing algorithm.

Packet headers contain information needed to choose the next hop. Choosing the next hop can be thought of as the composition of two functions. The first function partitions the entire set of possible packets into a set of "Forwarding Equivalence Classes (FECs)". The second maps each FEC to a next hop. Insofar as the forwarding decision is concerned, different packets which get mapped into the same FEC are indistinguishable. All packets which belong to a particular FEC and which travel from a particular node will follow the same path (or if certain kinds of multi-path routing are in use, they will all follow one of a set of paths associated with the FEC).

In conventional IP forwarding, a particular router will typically consider two packets to be in the same FEC if there is some address prefix X in that router's routing tables such that X is the "longest match" for each packet's destination address. As the packet traverses the network, each hop in turn reexamines the packet and assigns it to a FEC.

In MPLS, the assignment of a particular packet to a particular FEC is done just once, as the packet enters the network. The FEC to which the packet is assigned is encoded as a short fixed length value known as a "Label". When a packet is forwarded to its next hop, the label is sent along with it; that is, the packets are "labeled" before they are forwarded.

At subsequent hops, there is no further analysis of the packet's network layer header. Rather, the label is used as an index into a table which specifies the next hop, and a new label. The old label is replaced with the new label, and the packet is forwarded to its next hop.

In the MPLS forwarding paradigm, once a packet is assigned to a FEC, no further header analysis is done by subsequent routers; all forwarding is driven by the labels. This has a number of advantages over conventional network layer forwarding.

The format of a MPLS frame comprises a part of Header and a part of Payload. The part of payload contains the information of the upper layer to be transported. Among the various fields of the MPLS Header, there are the following:

Label: a label is a short, fixed length, locally significant identifier which is used to identify a FEC. The label which is put on a particular packet represents the Forwarding Equivalence Class to which that packet is assigned. Most commonly, a packet is assigned to a FEC based (completely or partially) on its network layer destination address. However, the label is never an encoding of that address.

Reserved: some bits are reserved for particular further use, out of the scope of the present description, and not described in further details.

TTL (Time-To-Live): each packet carries a "Time To Live" (TTL) value in its header, which is set at the generating node. Whenever a packet passes through a router (node), its TTL gets decremented by 1; if the TTL reaches 0 before the packet has reached its destination, the packet gets discarded. This provides some level of protection against forwarding loops that may exist due to misconfigurations, or due to failure or slow convergence of the routing algorithm.

Up to now the RPR and the MPLS networks are two separated networks and it is not possible to setup a unidirectional or bidirectional path from a customer box (upper layer) connected to an MPLS edge device and another customer box connected to an RPR edge device.

Therefore a problem is how to best interconnect RPR and MPLS networks.

SUMMARY OF THE INVENTION

Therefore it is the main object of the present invention to overcome the above problems, and provide a method and apparatus for RPR and MPLS network interworking, which is able to implement an end-to-end connection between an RPR and an MPLS network.

The basic idea of the present invention is to link the RPR network to the MPLS network (and viceversa) through a TLS (Transparent LAN Service) layer. In a preferred solution, the client layer is Ethernet, but any client layer can be considered, like IP.

By this way, it is possible to realize an end-to-end TLS path across RPR and MPLS networks.

These and further objects are achieved by means of a method, an apparatus and a transmission network, as described in the attached claims, which are considered an integral part of the present description.

BRIEF DESCRIPTION OF THE DRAWINGS

The invention will become clear from the following detailed description, given by way of a mere exemplifying and non limiting example, to be read with reference to the attached drawing figures, wherein.

BEST MODE FOR CARRYING OUT THE INVENTION

Figure 1:
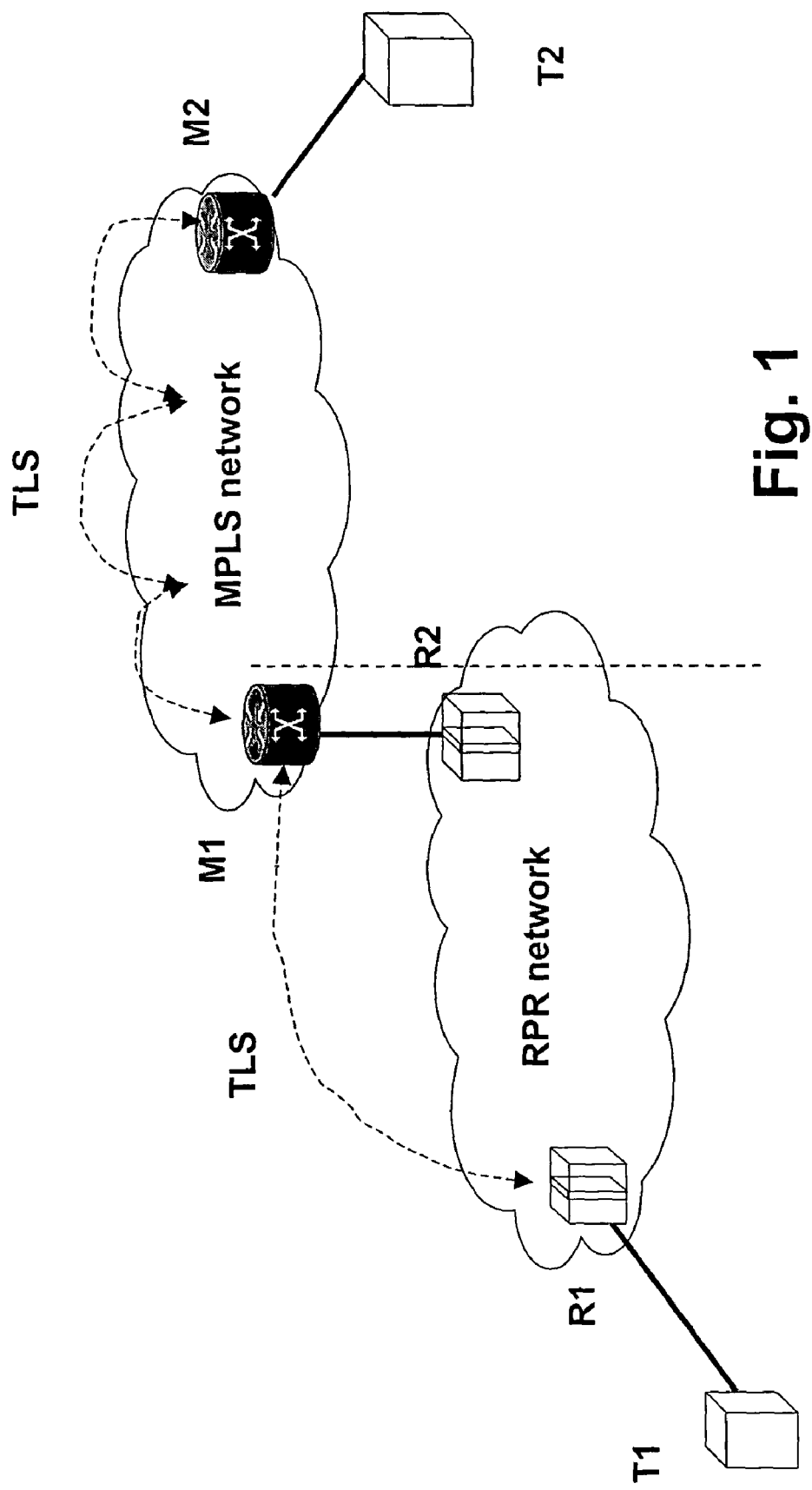
FIG. 1 shows a general system diagram of the link between an RPR network and an MPLS network through an TLS layer in accordance with the invention.

The link of the RPR network to the MPLS network (and vice versa) through a TLS layer is as shown in FIG. 1. In this case the client layer is Ethernet, but any client layer can be considered, like IP.

The TLS layer is described in the European Patent Application No. 02290476.7, filed on Feb. 28, 2002 by the same applicant, which is incorporated by reference herein.

The presence of the TLS layer in between the RPR and the customer (Ethernet) upper layer interfaces efficiently the RPR layer and the customer layer, in particular to manage packets coming from/addressed to several customer interfaces of a given edge node, also avoiding rejection of errored packets.

In more details, with reference to FIG. 1, in the RPR network the RPR edge node R1 receives an Ethernet frame from a customer terminal T1. This Ethernet frame has to be forwarded to another customer location T2 connected to the edge node M2 of the MPLS network.

The Ethernet frame received in R1 is encapsulated in a TLS frame.

Figure 2:
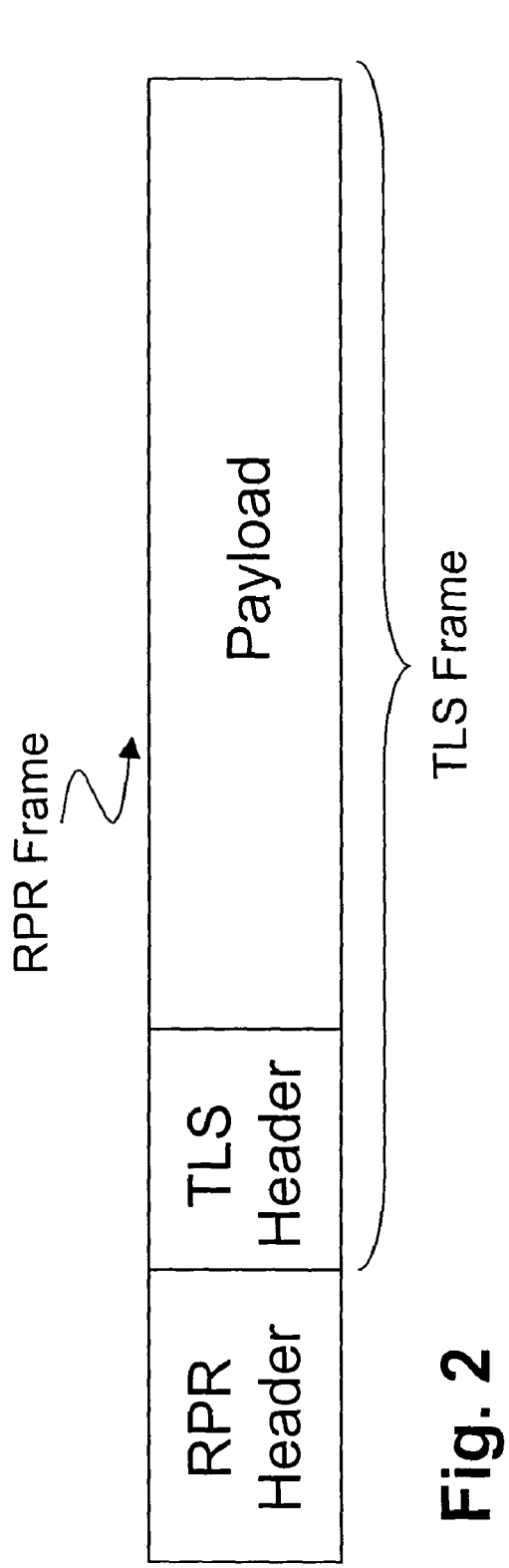
FIG. 2 shows a RPR/TLS frame.

With reference also to FIG. 2, an auxiliary TLS Header is added to the Ethernet frame, obtaining a TLS frame. Then the TLS frame is encapsulated in the data transport layer packet by adding an RPR Header, obtaining an RPR frame which shall be utilized by the network of the service provider to transport the packet from edge node R1 to edge node R2. In this specific case, in the RPR header the field "source address ID" shall contain the identifier of node R1; the field "destination address ID" shall contain the identifier of node R2; the field "Protocol Type" is filled with a corresponding value for the TLS protocol.

Then, the edge node R2 receives the RPR frame transmitted by the edge node R1 and passes it to the edge node M1 of the MPLS network.

Figure 3:
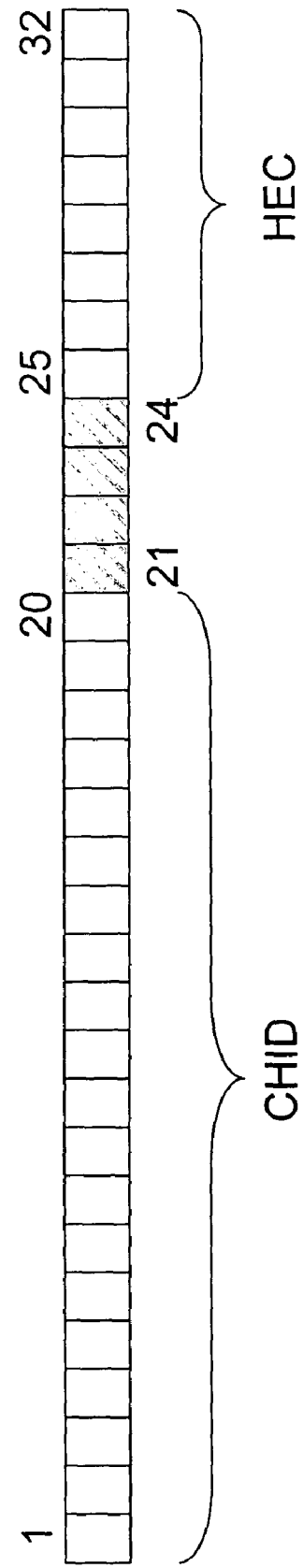
FIG. 3 shows the assignment of bits to the TLS Header.

As shown in FIG. 3, in the auxiliary TLS Header information is inserted about the channel identifier CHID of the connection between the input port and the destination port of the Ethernet frame. The channel identifier CHID is set according to the value assigned to the TLS communication from the RPR edge node R1 to the MPLS edge node M2, via the RPR edge node R2. The CHID will identify the connection between the two end points; the RPR edge node R2 is an intermediate point of the connection and it has to understand that a packet with the given CHID has to be passed to the MPLS network, as described below, in connection with FIGS. 4 and 5.

In addition, in order to assure a greater safety in the distribution phase of incoming packets (namely to avoid errored distributions), bits are reserved to carry out, in reception, a control (HEC) of the possible accumulated errors in the TLS Header during the transport in the RPR ringlet.

As a non limiting example, in the TLS Header Bits 1 to 20 are assigned to the channel identifier CHID; bits 25 to 32 are assigned to error correction HEC. The HEC field is filled with the value calculated on the other bits of the TLS Header (in the example the previous 24 bits). The algorithm utilized to calculate the HEC shall not be described since it can be any suitable known one. Some further bits (bits 21-24, hatched in FIG. 3) are foreseen for further use. Of course, the number of bits assigned to the various fields (and/or their arrangement) could be changed.

In the edge node M1 of the MPLS network, in the direction from RPR to MPLS, the TLS Header is converted in an MPLS Header. The steps to be followed are, with reference to FIG. 4:

1) TLS Channel_ID CHID field is left unchanged and becomes the MPLS Label.

2) TLS Reserved bits are left unchanged and put in the same position in the MPLS header.

3) The TLS Header HEC is removed and a predefined MPLS TTL value is inserted.

In the edge node M1 of the MPLS network, in the opposite direction from MPLS to RPR, the MPLS Header is converted in a TLS Header. The steps to be followed are, with reference to FIG. 5:

1) MPLS Label field is left unchanged and becomes the TLS Channel—ID CHID.

2) MPLS Reserved bits are left unchanged and put in the same position in the TLS header.

3) The MPLS TTL is removed and a TLS Header HEC, calculated over the previous bits of the Header, is inserted.

The steps of the method according to the present invention can be now summarized as follows, with reference to FIG. 1:

A) In the Direction from RPR to MPLS:

The frames of the client layer, Ethernet frames in the example, coming from the client device/customer terminal T1 are received by the RPR edge node R1. They are encapsulated in TLS packets, indicating the destination port on the destination node, by assigning a CHID value.

The TLS packets are then encapsulated in RPR packets in order to identify the RPR edge node R2 connected to the MPLS network edge node M1.

Once the RPR packets reach the RPR edge node R2, the TLS packets are passed to the MPLS network edge node M1. The TLS packets become now MPLS packets and travel in the MPLS network in a known way, till the final destination MPLS edge node M2, where the MPLS Header is popped and the client Ethernet frame is passed to the client device/customer terminal T2.

B) In the Direction from MPLS to RPR:

The Ethernet frames coming from the client device/customer terminal T2 are received by the MPLS edge node M2. They are encapsulated in MPLS packets with a proper Label indicating the LSP (Label Switched Path) that has to be followed up to the final destination.

The MPLS packets are switched inside the MPLS network in a known way, till reaching the MPLS edge node M1 connected to the RPR network edge node R2.

In the MPLS edge node M1 the MPLS packets become TLS packets and are passed to the RPR network edge node R2. In R2 the TLS packets are encapsulated in RPR packets.

The RPR packets travel in the RPR network up to the RPR edge node R1 where both the RPR and TLS headers are popped and the client Ethernet frame is passed to the client device/customer terminal T1.

It has to be noted that the interface connecting the RPR and MPLS networks can be a physical layer like, but not limited to, SDH or SONET, or Ethernet.

The present invention relates also to an apparatus and to a transmission network to implement the method.

Figure 5:
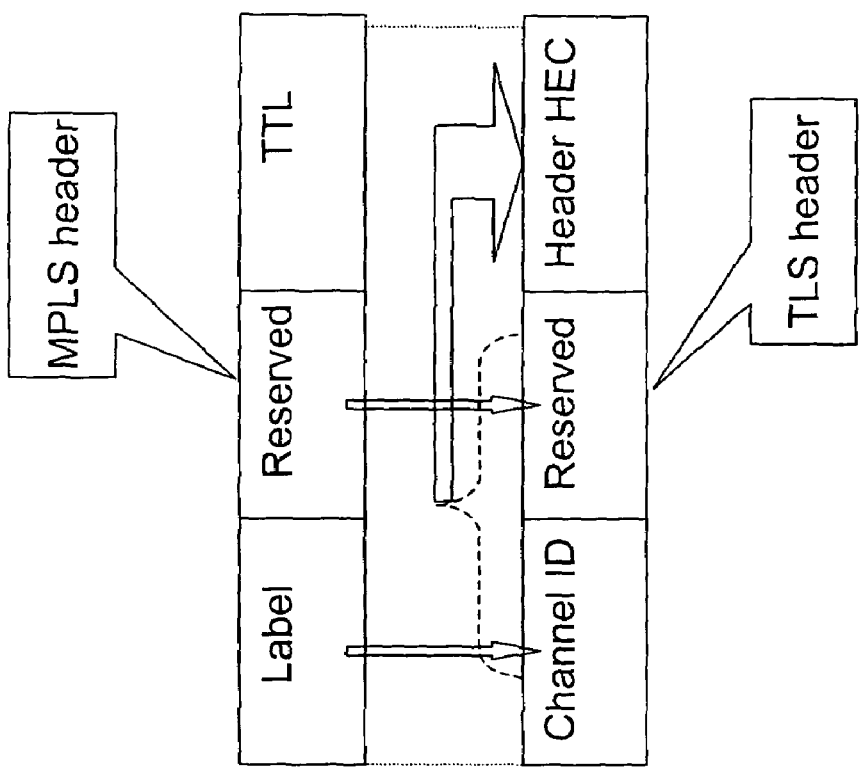
FIGS. 4 and 5 show the Header conversion between TLS and MPLS layer and viceversa respectively.
Figure 4:
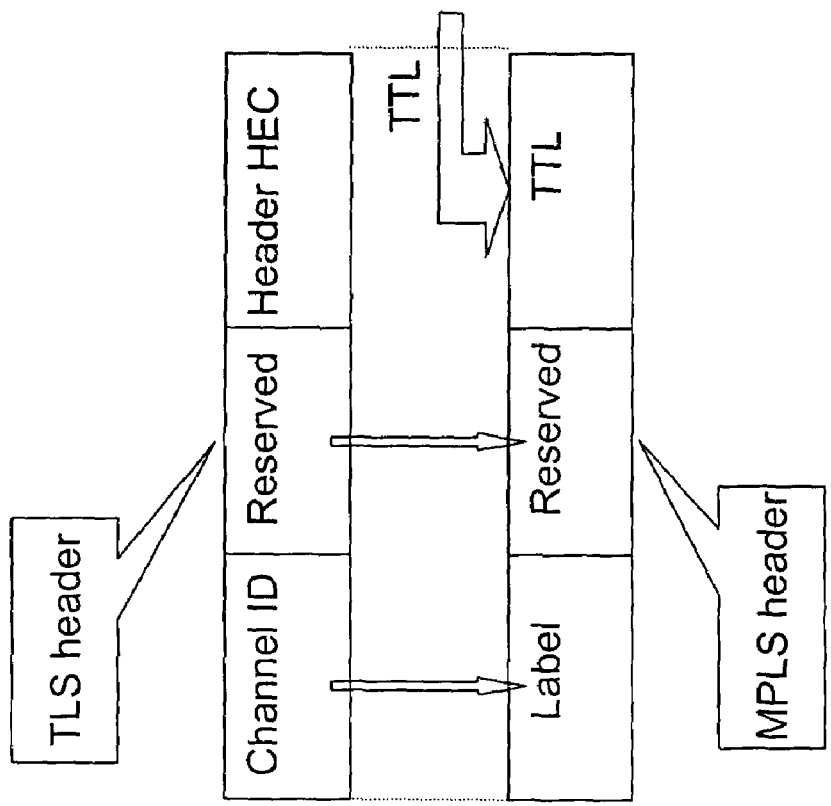

As far as the apparatus is concerned, from the implementation point of view, the edge nodes of the RPR and/or the MPLS networks, as a difference with respect to the known edge nodes, have also to include:

- means for adding the TLS Header to the RPR Header in the RPR edge nodes, as described with reference to FIGS. 2 and 3; and/or
- means for transforming the TLS Header into an MPLS Header and/or vice-versa, as described with reference to FIGS. 4 and 5; and/or
- at the edge nodes between the two networks (R2 and M1 in FIG. 1), means for selecting the port connected to the corresponding port of the edge node of the other network, on the basis of the CHID (for the RPR network), or Label (for the MPLS network) value.

This is at the reach of the man skilled in the art, without giving further detailed explanation, as well as the embodiment of a transmission network as shown in FIG. 1.

The present invention could indifferently be implemented via hardware or software. In the latter case, it is extended to a program for computer comprising coding means for implementing all the phases of the method, when said program is running in the computer. Besides, it includes computer readable means having a recorded program, wherein said computer readable means comprise coding means for implementing all the phases of the method, when said program is running on a computer.

Implementation details will not be described, as the man skilled in the art is able to carry out the invention starting from the teaching of the above description.

There has thus been shown and described a novel method and apparatus for end-to-end connection between an RPR and an MPLS network which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for realizing an end-to-end connection between a client layer connected to a Resilient Packet Ring (RPR) network and a client layer connected to a Multi Protocol Label Switching (MPLS) network, the method comprising:

interconnecting the RPR network and the MPLS network through a Transparent LAN Service (TLS )layer;

in the direction from RPR to MPLS:
 encapsulating received client frames in TLS packets, indicating the final destination;
 encapsulating the TLS packets in RPR packets and passing the encapsulated TLS packets to the MPLS network;
 wherein the TLS packets become MPLS packets and travel in the MPLS network until the final destination; and in the direction from MPLS to RPR:
 encapsulating received client frames in MPLS packets, indicating a Label Switched Path (LSP) that has to be followed up to the final destination;
 switching the MPLS packets inside the MPLS network and then passing the switched MPLS packets to the TLS network, becoming TLS packets;
 encapsulating the TLS packets in RPR packets and wherein the encapsulated PLS packets travel in the RPR network, until the final destination, wherein an auxiliary TLS Header is added to said received client frames, obtaining said TLS packets; then an RPR Header is added to said TLS packets, obtaining said RPR packets, and in that said TLS Header contains a channel identifier field, identifying the connection between the client layer connected to the RPR network and the client layer connected to the MPLS network, said TLS Header further containing Reserved bits and Error correction bits, and wherein in the direction from RPR to MPLS, the TLS header is converted in an MPLS Header by the following steps:

the TLS channel identifier field is left unchanged and becomes the MPLS Label in the MPLS header;

TLS Reserved bits are left unchanged and put in the MPLS header;

the TLS Error correction bits are removed and a predefined MPLS Time-to-live value is inserted in the MPLS header.

2. A method as in claim 1, wherein in the direction from MPLS to RPR, the MPLS Header is converted in a TLS Header by the following steps:

the MPLS Label field is left unchanged and becomes the TLS channel identifier field;

MPLS Reserved bits are left unchanged and put in the TLS header;

the MPLS Time-to-live is removed and TLS Error correction bits are inserted in the TLS Header.

3. An MPLS node suitable to implement the method of claim 2, wherein the MPLS node comprises:

means for converting the TLS Header into an MPLS Header and vice-versa; and means for selecting a port connected to a corresponding port of a node of the RPR network, on the basis of the Label value.

4. An RPR node suitable to implement a method for realizing an end-to-end connection between a client layer connected to a Resilient Packet Ring (RPR) network and a client layer connected to a Multi Protocol Label Switching (MPLS) network, the method comprising:

interconnecting the RPR network and the MPLS network through a Transparent LAN Service (TLS) layer;

in the direction from RPR to MPLS:

encapsulating received client frames in TLS packets, indicating the final destination;

encapsulating the TLS packets in RPR packets and passing the encapsulated TLS packets to the MPLS network;

wherein the TLS packets become MPLS packets and travel in the MPLS network until the final destination; and in the direction from MPLS to RPR:

encapsulating received client frames in MPLS packets, indicating a Label Switched Path (LSP) that has to be followed up to the final destination;

switching the MPLS packets inside the MPLS network and then passing the switched MPLS packets to the TLS network, becoming TLS packets;

encapsulating the TLS packets in RPR packets and wherein the encapsulated PLS packets travel in the RPR network, until the final destination, wherein an auxiliary TLS Header is added to said received client frames, obtaining said TLS packets; then an RPR Header is added to said TLS packets, obtaining said RPR packets, and in that said TLS Header contains a channel identifier field, identifying the connection between the client layer connected to the RPR network and the client layer connected to the MPLS network, said TLS Header further containing Reserved bits and Error correction bits, and wherein the RPR node comprises:

means for adding the TLS Header to the RPR Header; and means for selecting a port connected to a corresponding port of a node of the MPLS network, on the basis of the channel identifier field value.

\* \* \* \* \*